Oct. 16, 1962  H. SHAPIRO  3,058,339
VIBRATION DETECTOR AND MEASURING INSTRUMENT
Filed Sept. 2, 1958  2 Sheets—Sheet 2

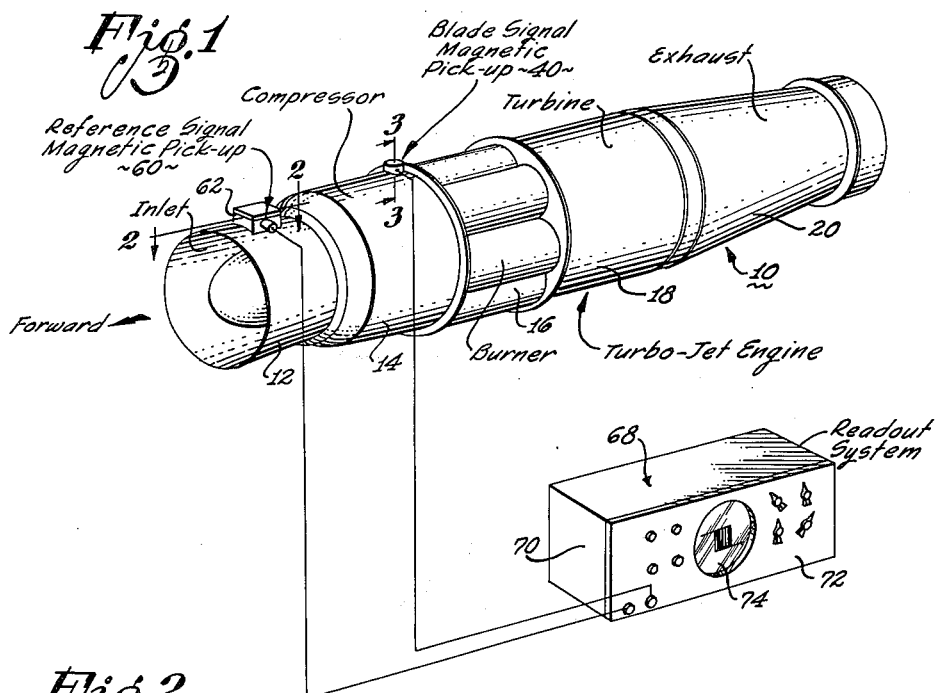

A — No Vibration of Displayed Blade
B — Vibration of Displayed Blade
C — Same Display as "B" with Center Portion Expanded INVENTOR:
Henry Shapiro
By Smyth & Roston
Attorneys

United States Patent Office 3,058,339
Patented Oct. 16, 1962

---

3,058,339
VIBRATION DETECTOR AND MEASURING
INSTRUMENT
Henry Shapiro, Culver City, Calif., assignor to Curtiss-Wright Corporation, Propulsion Products Division, Santa Monica, Calif.
Filed Sept. 2, 1958, Ser. No. 758,516
9 Claims. (Cl. 73—71.4)

The present invention relates to apparatus for measuring rotor blade vibrations of a turbojet or turboprop engine, or the like, while the engine is running under actual operating conditions.

Rotor blade vibrations in jet engines have usually been measured in the past by the use of strain gauges and slip rings, or by similar equipment. However, this has represented a costly and complex approach to the problem. The present invention is intended to fulfill the pressing need which has arisen in recent years for an instrument which is capable of detecting and measuring the vibrations of the rotor blades of a turbojet or turboprop engine in a rapid and straight forward manner; even, for example, during an actual flight of an aircraft in which the engine is installed.

The invention is specifically directed, therefore, to a convenient, simple and reliable instrument for measuring the vibration of the rotor blades of a turbojet or turboprop engine while the engine is actually running. It will become apparent as the description proceeds, however, that the detecting and measuring equipment of the invention has wider utility, and that the equipment may be used in any application where it is necessary or desirable to detect and measure the vibration of rotor blades to be detected and measured.

For reasons of clarity, the following description will be directed to a blade vibrator detector, constructed in accordance with one embodiment of the invention, and as utilized to determine the extent of rotor blade vibrations in the compressor of a turbojet engine.

As noted briefly above, the apparatus and system of the invention is advantageous in that it does not require slip rings and expensive strain gauge installations. In addition, the equipment of the invention does not require any rubbing surfaces, so that it has a resulting long life as compared with the prior art mechanisms. Moreover the instrument and equipment of the invention has a lower over-all cost as compared with the prior art units which were previously used in attempts to accomplish the purposes of the invention.

The instrument of the present invention can be used in the laboratory, for example, in turbo engine research. With the relatively simple equipment of the invention it is possible to record the blade vibratory stress level, and the onset of rotating stall between the period of no rotating stall changing to rotating stall. At the onset of rotating stall the blade loading changes from the steady gas load to periods of full loading and zero loading. The amount of blade deflection for this variation in loading can be recorded and measured in a convenient manner by the equipment of the invention.

The invention can also be most conveniently used in the production line of turbo engines and the like. The instrument makes it commercially feasible for the dynamic stability of each engine coming off the line to be checked before the engine is shipped. This provides a means for detecting defective rotor blades, so that such defective blades may be replaced, before the engine is actually put into use.

The invention is also most useful as standard equipment in aircraft using turbo engines. Such an installation permits the flight engineer to periodically inspect each blade in the turbo engines, while the aircraft is actually in flight. This provides an opportunity for an early determination of any impending blade failure in the turbo engines of the aircraft.

Reference is now made to the attached drawings for a detailed description of one embodiment of the improved blade vibration detector and measuring instrument of the invention, the drawings illustrating the equipment as being used to measure the vibration of the rotor blades of the compressor section of a turbojet engine.

In the drawings:

FIGURE 1 is a representation of one embodiment of the improved blade vibration detector equipment of the invention as used in conjunction with the compressor section of a turbojet engine, the equipment being used to indicate and measure the vibration of the rotor blades of the engine;

FIGURE 2 is a sectional view substantially on the line 2—2 of FIGURE 1 and showing the manner in which a reference signal is developed by the use of an electromagnetic transducer which is mounted in cooperating relationship with a rotating arm which, in turn, is coupled to the rotor of the engine of FIGURE 1;

Figure 4:
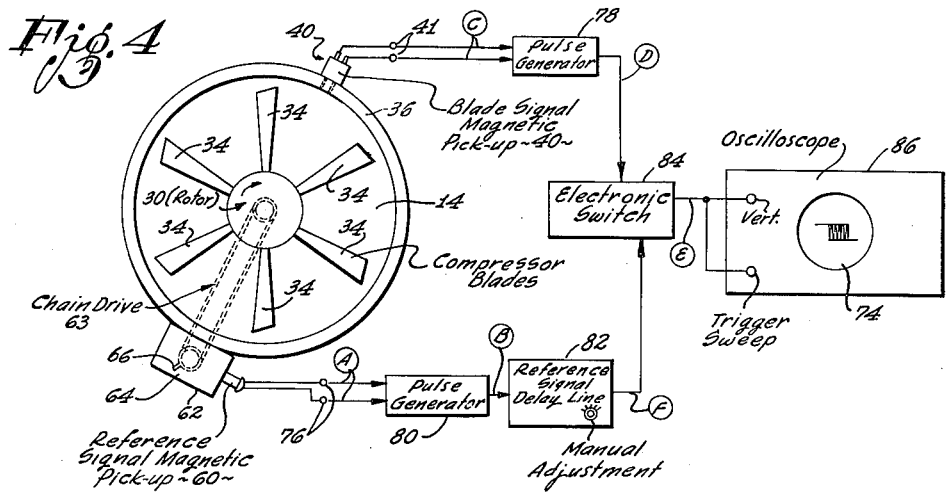
Figure 5:
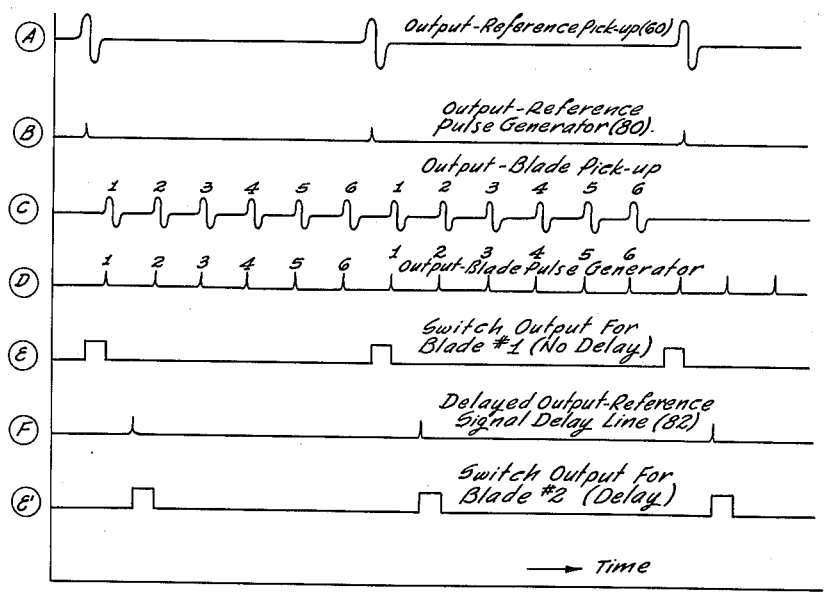
Figure 6:
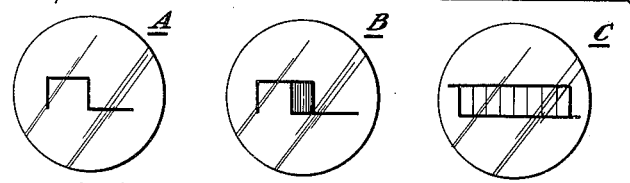

FIGURE 3, a sectional view substantially on the line 3—3 of FIGURE 1, is a fragmentary showing of an electro-magnetic pick-up transducer threaded into the housing of the turbo engine, the combination being such that the blades of the turbo rotor included in the compressor section of the engine vary the air gap of the transducer, such variation in the air gap producing a resultant change in the reluctance of the magnetic circuit of the transducer and a corresponding signal at its output terminals which indicates the passage of the rotor blades through its magnetic field;

FIGURE 4 is a schematic diagram, partly in block form, showing the various components of the illustrated embodiment of the invention, and further illustrating the manner in which the components are connected together and how they are coupled to the turbo engine of FIGURE 1;

FIGURE 5 is a series of curves useful in explaining the operation of the vibration measuring equipment of the invention;

FIGURE 6 is a schematic showing of various displays which appear on the screen of an oscilloscope used in the equipment of the invention, and which displays show the presence and amount of blade vibration for successive revolutions of the rotor of the engine of FIGURE 1.

As indicated above, FIGURE 1 shows in somewhat schematic form a portion of a turbojet engine, the engine being designated as 10 in FIGURE 1. As is usual with engines of this general type, the assembly has a generally cylindrical configuration, with a plurality of sections spaced axially along the unit. The first section is designated the inlet 12, the second section is the compressor 14, the third is burner 16, the fourth is the turbine 18, and the fifth is the exhaust section 20.

The actual operation of the turbojet engine is known, and does not have any materiality to the description of the present invention. For that reason, a detailed description of the operation of the engine will not be included. However, it should be pointed out that the compressor section 14 of the turbojet engine includes a rotor 30 (FIGURE 4) which is rotatable about a central axis, and the rotor has a plurality of radial blade-like members 34 extending outwardly from its hub. The rotor is illustrated in FIGURE 4 as being surrounded by a housing 36 which forms the casing for the compressor. The blades 34 are composed of a magnetic material, such as steel.

As discussed above, as the rotor 30 rotates, there is a tendency for the blades 34 to vibrate. The purpose of the present invention is to indicate the presence of a vibration, and measure the vibration, of any selected one of the blades 34. To accomplish this purpose, an electro-magnetic pick-up transducer 40 is threaded into the housing 36 of the compressor section 14. The pick-up exhibits an air gap at the inner surface of the housing 36. Then, as the blades sweep across the air gap of the transducer 40, they change the reluctance of the magnetic circuit of the transducer. This causes the transducer to develop a signal which will be discussed in more detail subsequently.

The constructional details of one possible embodiment of the electro-magnetic pick-up transducer 40 are shown in FIGURE 3. It will be understood, however, that any suitable electro-magnetic pick-up transducer head may be used. This unit may, for example, have a casing 42 composed of magnetic material such as steel. The casing 42 has a portion 42a which is threaded into a threaded hole in the compressor housing 36. The casing 42 is in this manner mounted on the housing 36 so that its threaded portion 42a extends through the housing. The inner end of the portion 42a of the housing defines an annular air gap 44 at the inner surface of the housing 36.

A disk-like cover 46 encloses the outer end of the casing 42, and the cover is secured to the casing by a plurality of screws 48. The cover is also composed of magnetic material, such as steel, to complete the magnetic circuit. A permanent magnet 50 is supported within the electro-magnetic pick-up 40, and it may be a usual bar magnet. The magnet is supported on the under side of the cover 46 by means of a screw 52. The magnet 50 extends down through the pick-up and into the annular air gap 44. The tip of the magnet 50 may, for example, be disposed adjacent the inner surface of the housing 36.

An electric winding 54 is wound about the permanent magnet 50 within the casing 42. This winding has a pair of leads 56 which are connected to the output terminals 41 in FIGURE 4. The permanent magnet 50 establishes a localized magnetic field in the vicinity of the air gap 44 at the inner surface of the housing 36. This magnetic field extends from the lower end of the permanent magnet and across the annular air gap 44 to the casing 42. The portion 42a of the casing and cover 46 constitute the return magnetic path for the magnetic flux. As each blade 34 passes across the air gap 44, the reluctance of the magnetic path is changed, and this change causes a corresponding change in a characteristic of the signal produced across the terminals 41.

As more clearly shown in FIGURE 2, a second magnetic pick-up 60 is mounted on the side of a housing 62, the housing being supported on the engine 10. This housing 62 may be a usual accessory pad on which accessories are mounted in known manner, and an auxiliary shaft 64 is enclosed by the housing. This auxiliary shaft 64 is illustrated in FIGURE 4 as being coupled to the rotor 30 by a chain drive 63. This illustration is merely for convenience in illustrating the assembly, it being more usual in engines of this type for the auxiliary shaft 64 to be directly coupled to the rotor shaft 30 and to be used to drive accessories utilized in conjunction with the engine. In any event, the coupling between the auxiliary shaft 64 and the rotor 30 is such that the auxiliary shaft turns at exactly the same speed as the rotor.

A radial arm 66 is affixed to the auxiliary shaft 64, and the tip of the arm 66 moves past the localized magnetic field developed by the pick-up transducer 60. The arrangement is such that the arm 66 produces a variation in a characteristic in the reference signal generated by the transducer 60 as its output terminals 76 (FIGURE 4) each time it passes through the field of the transducer. The reference signal developed by the transducer 60, therefore, has a characteristic variation for each revolution of the auxiliary shaft 64 which, in turn, corresponds to each revolution of the rotor 30.

As shown in FIGURE 1, the transducer 40 and the transducer 60 are both connected to terminals of a read-out system and apparatus 68. The read-out system is enclosed in an appropriate housing 70, as illustrated, and a control panel 72 is mounted on the front of the housing. The control panel contains the necessary adjusting knobs, and it also supports the screen of the cathode-ray tube of an oscilloscope 74, with the screen projecting through a central aperture in the control panel.

The output terminals 41 of the pick-up 40 are shown in FIGURE 4 as being connected to a pulse generator 78, and the output terminals 76 of the pick-up 60 are shown as being connected to a pulse generator 80. The pulse generators 78 and 80 may be of any known and suitable construction, and these generators function to amplify the electric signals from their associated pick-ups so as to produce precisely timed, sharp output pulses. The pulse generator 78, for example, produces an output pulse each time a rotor blade 34 passes the pick-up 40, and the pulse generator 80 produces an output pulse each time the rotating arm 66 passes the pick-up 60.

The output terminal of the pulse generator 80 is connected to a delay line 82 which is adjustable. This delay line, likewise, may have any known construction, and is manually adjustable to delay the output pulses from the pulse generator 80 by any desired amount.

The components of the read-out system shown in FIGURE 4 include an electric switch 84. The output terminal of the pulse generator 78 is connected to one input terminal of the switch, and the output terminal of the delay line 82 is connected to a second input terminal. The electronic switch 84 may be a usual bi-stable flip-flop, this being a type of relaxation circuit well known to the electronic art. A pulse introduced to one input terminal of the electronic switch 84 actuates it from one stable operating condition to another. The switch then remains in its second stable operating condition until it is returned to its first condition by a signal introduced to its other input terminal.

The output terminal of the electronic switch 84 is connected to the vertical sweep deflection input terminal and to the horizontal sweep trigger input terminal of a usual oscilloscope 86. As mentioned above, the screen of the cathode-ray tube 74 in the oscilloscope projects through a central aperture in the control panel 72 shown in FIGURE 1.

The electronic switch 84 may be considered to be turned on when a reference pulse is introduced to it from the delay line 82, and this switch may be considered to be turned off when a blade pulse is introduced to its other input terminal from the pulse generator 78. The oscilloscope display starts its horizontal sweep along the "X" axis the moment the electronic switch 84 is turned on and is also deflected along the "Y" axis at the beginning of the sweep. The cathode-ray beam therefore defines a horizontal line displaced from the zero "X" axis for the portion of each sweep in which the switch 84 is on. Then, when the electronic switch 84 is turned off by the blade pulse from the pulse generator 78, the trace returns immediately to the zero "X" axis. The control is such that the selected blade causes the switch 84 to be turned off during the interval of each sweep of the cathode-ray beam.

The invention is predicated on the observance of the time of passage of a vibrating rotor blade 34 past a fixed point. For example, if the time from the passage of the reference arm 66 past its pick-up 60 to the time that the vibrating rotor blade passes the blade pick-up 40 is measured in successive revolutions of the rotor 30, the time will be a constant if the selected blade is not vibrating. When the blade vibrates, however, the time in question will vary from revolution to revolution depending upon the position of the vibrating blade when it passes its pick-up 40. Therefore, if a particular blade is observed once per revolution of the rotor, and if the blade is vibrating, the time variations of its passage past the pick-up 40 will indicate from revolution to revolution the extremes of blade deflection.

The output signal developed by the reference pick-up 60 is shown in the curve A of FIGURE 5. This signal has an amplitude variation each time the reference arm 66 passes the pick-up to indicate the completion of a revolution of the rotor 30. The reference signal of curve A in FIGURE 5 has a positive and a negative peak for each revolution of the rotor. This signal, as mentioned before, is introduced to the pulse generator 80, and the pulse generator 80 develops a sharp reference pulse for each revolution of the rotor 30. These reference pulses are shown in the curve B of FIGURE 5, with each pulse exhibiting a positive spike at the precise moment the rotating arm 66 passes through the field of the pick-up 60.

In like manner, the pick-up 40 develops a blade signal which is shown in the curve C of FIGURE 5. This blade signal exhibits a positive and negative amplitude variation each time one of the blades 34 passes through the field of the pick-up 40. For purposes of the present description, it will be assumed that the rotor 30 has six blades 34, so that the blade signal exhibits six amplitude variations for each revolution of the rotor. The blade signal is illustrated in the curve C of FIGURE 5, and this signal is introduced to the pulse generator 78.

The pulse generator 78 develops a series of sharp positive pulses, as shown by the curve D of FIGURE 5. Each of these pulses corresponds to the passage of a corresponding blade 34 past its pick-up 40, and there are six of the pulses in curve D for each revolution of the rotor 30.

Assume that the delay line 82 is set to a position in which it passes the reference pulses from the pulse generator 80 to the switch 84 with no appreciable time delay. Then, at a time just before the first rotor blade 34 passes the pick-up 40, the delay line 82 introduces a reference pulse to the switch 84 to turn the switch on. Then, the pulse from the pulse generator 78 corresponding to the first rotor blade turns the switch off.

The pulses corresponding to the other rotor blades have no effect on the switch 84 because it remains off until it is turned on again by the reference pulse from the delay line 82. Therefore, for the above-described condition, the switch 84 is turned on by the reference pulse of the curve B of FIGURE 5 just before the first blade pulse in each revolution, and it is turned off by the first blade pulse. The switch output for this condition therefore is as shown by the curve E of FIGURE 5. The curve E represents the series of pulses bearing information concerning the first blade only. For no vibration of the first blade, and assuming constant rotor speed, each pulse of the curve E will have the same duration from revolution to revolution of the rotor. However, when the first blade is vibrating, these pulses will change in their duration from revolution to revolution.

As noted above, the pulses of the curve E are introduced to the oscilloscope 86 to be displayed on the screen of the cathode-ray tube 74. For no vibration of the blade selected for observation, the trace on the screen of the oscilloscope 74 will be as shown by the display A in FIGURE 6. Because each pulse starts at the same time and has the same duration as the other pulses, a sharp pulse appears on the screen of the oscilloscope. However, when there is vibration of the selected blade, successive pulses in the curve E will have different durations. Therefore, the trace on the screen of the oscilloscope will be as shown by the display B in FIGURE 6. In the latter display, the trailing edge of the pulses changes between two limits, and these limits constitute a measure of the blade vibration.

The display C in FIGURE 6 is similar to the display B, but with the center portion of the display expanded along the X axis so that the amount of blade vibration can be better examined and measured.

When it is desired to measure the vibration of other blades, it is merely necessary to shift the adjustment of the delay line 82 to bring the reference pulse from the pulse generator 80 into cooperating relationship with a different set of blade pulses from the pulse generator 78. For example, the output pulses from the delay line 82 can be delayed so that they assume the position shown in the curve F of FIGURE 5. Then, the output pulses from the delay line turn the switch 84 on just before the occurrence of each pulse from the generator 78 corresponding to the second blade.

Therefore for the second condition, only the pulses corresponding to the second blade from the pulse generator 78 have any effect on the switch 84. This results in a series of pulses, as shown by the curve E' in FIGURE 5, and which have durations corresponding to the interval in which the switch 84 is on for successive revolutions of the rotor 30. These latter pulses, in a manner similar to that described above, cause the oscilloscope 86 to produce a display which indicates the amount of vibration of the tip of the second blade.

Therefore, by the simple adjustment of the delay line 82, each blade of the rotor 30 may be individually examined, and any vibrations in the tip of the examined blade may be detected and measured.

The invention, therefore, enables a constant monitoring check to be kept on the rotor blades of rotating machinery to determine that the stresses set up in the blades never exceed predetermined safe levels. As also indicated, the instrument and equipment of the invention can be used in the laboratory for determining the safe levels of stresses in the rotor blades, and for other purposes. Likewise, the equipment of the invention can be used in the factory as a final check on the engines before they are shipped to a customer.

I claim:

1. Apparatus for detecting the blade vibrations of the rotor of a turbo engine, and the like, said apparatus including: first transducer means for producing a localized magnetic field in the path of the blades of the above mentioned rotor as the rotor rotates and including means responsive to the passage of the blades through the magnetic field for developing a blade signal, first pulse generating means coupled to the first transducer means and responsive to the blade signal for developing a blade pulse for each such passage of each blade through the magnetic field, means including second transducer means for developing a reference signal indicating each revolution of the rotor, second pulse generating means coupled to the second transducer means and responsive to the reference signal for developing a reference pulse each time the rotor passes through a predetermined angular position, signal-actuated switching means having a first stable operating condition and having a second stable operating condition, delay means coupled to the second pulse generating means to apply the reference pulse with a preselected time delay to the switching means so as to actuate the same from its first to its second operating condition, said switching means being coupled to said first pulse generating means to enable the blade pulse immediately following the reference pulse in each rotation of the rotor to return the switching means to its first operating condition, said delay line being adjustable for delaying the reference pulse different predetermined amounts so as to bring the same into cooperating relationship with different selected ones of the blade pulses for each revolution of the rotor, and oscilloscope means coupled to the switching means for presenting a display of the time interval in which the switching means is in its second operating condition for each revolution of the rotor.

2. Apparatus for detecting the vibration of any one of a number of blades of a rotor as the rotor rotates, including, first means for developing a pulse each time each blade passes a predetermined point during the rotation of the rotor, second means coupled to the rotor for developing a pulse each time the rotor passes through a predetermined angular position, adjustable delay circuit means coupled to said second means for delaying the pulse by a predetermined interval to select any one of the blades for detection, and means coupled to said adjustable delay means and to said first means for measuring the time interval between the pulses corresponding to the selected blade with the delayed reference pulses from said delay circuit means.

3. Apparatus for providing an indication of the root stress due to vibration of any one of a number of blades of a rotor as the rotor rotates, including, first means for developing a pulse each time each blade passes a predetermined point during the rotation of the rotor, second means coupled to the rotor for developing a pulse each time the rotor passes through a predetermined angular position, adjustable delay circuit means coupled to said second means for delaying the pulse by a predetermined interval to select any one of the blades for detection, and means coupled to said adjustable delay means and to said first means for indicating the relative times of the pulses therefrom to provide an indication of the root stress of said selected blade due to the vibration of said selected blade.

4. Apparatus for detecting the vibration of any one of a number of blade-like members of a rotor as the rotor rotates, said apparatus including: means disposed relative to the blade-like members for developing first signals each time that each blade-like member passes a particular point in each revolution of the rotor, means disposed relative to the rotor for developing a second signal each time that the rotor passes through a particular angular position, means responsive to the second signal for delaying the second signal by a particular time interval to select the particular ones of the first signals corresponding to a particular one of the blade-like members in each revolution of the rotor, and means responsive to the delayed second signal and to the selected ones of the first signals for measuring the time intervals between successive pairs of the delayed second signals and the selected ones of the first signals in the successive revolutions of the rotor to indicate any vibration of the particular one of the blade-like members.

5. Apparatus for detecting the vibration of a particular one of a number of blade-like members of a rotor as the rotor rotates, said apparatus including: transducer means disposed relative to the blade-like members to produce a localized magnetic field in the path of the rotation of the blade-like members past the transducer means and including means responsive to rotary movements of said blade-like members through said field for developing a blade signal each time a blade-like member passes said transducer means; means responsive to rotation of the rotor for developing a reference signal for each revolution of the rotor, said reference signal developing means including means adjustable for causing the reference signal to be developed every time a particular one of the blade-like members passes the transducer means; and means responsive to the blade signals and the reference signals for detecting the time intervals between successive pairs of the reference signals and the blade signals for the particular one of the blade-like members in successive revolutions of the rotor to indicate any vibrations in the particular one of the blade-like members during the rotary movement of such particular one of the blade-like members.

6. Apparatus for detecting any vibration in a blade of a rotor, said apparatus including: first transducer means disposed relative to the blade for producing a first localized magnetic field in the rotary path of the blade and including means responsive to the passage of the blade through the first localized magnetic field for developing a blade pulse for each such passage of the blade, an auxiliary shaft coupled to the rotor, means including a radial arm coupled to the auxiliary shaft, second transducer means disposed relative to the radial arm for producing a second localized magnetic field in the rotary path of the radial arm and including means responsive to the passage of the radial arm through such second localized magnetic field for developing a reference pulse in accordance with each such passage, and means responsive to the blade and reference pulses in each revolution of the rotor for detecting the time interval between each reference pulse and the blade pulse during each revolution of the rotor to provide an indication of any blade vibration in accordance with variations in successive time intervals.

7. Apparatus for detecting the blade vibration of a rotor, said apparatus including: first transducer means for producing a localized magnetic field in the path of the blades of the above mentioned rotor as the rotor rotates and including means responsive to the passage of the blades through the magnetic field for developing a blade signal, first pulse generating means coupled to the first transducer means and responsive to the blade signal for developing a blade pulse for each such passage of each blade through the magnetic field, means including second transducer means for developing a reference signal, second pulse generating means coupled to the second transducer means and responsive to the reference signal for developing a reference pulse each time the rotor passes through a predetermined angular position, means including an oscilloscope coupled to said first and second pulse generating means and responsive to the pulses produced thereby for displaying for successive rotations of the rotor a trace of the time interval between each reference pulse and a corresponding blade pulse produced by a preselected one of the rotor blades, and adjustable delay means interposed between said second pulse generating means and the oscilloscope for delaying each reference pulse a predetermined amount so as to bring the same into co-operating relationship with a selected one of the blade pulses for each revolution of the rotor.

8. Apparatus for detecting any vibration of a blade in a rotor, said apparatus including: first transducer means disposed relative to the blade for producing a localized magnetic field in the rotary path of the blade and including means responsive to the passage of the blade through the magnetic field for developing a blade pulse for each such passage of the blade, second transducer means disposed relative to the rotor for developing a reference pulse upon each rotary movement of the rotor past a particular angular position, signal actuated switching means having first and second operative states, means operatively coupled to the switching means and responsive to the reference pulses for actuating the switching means from the first operative state to the second operative state, means operatively coupled to the switching means and responsive to the blade pulses to actuate the switching means from the second operative state to the first operative state, and oscilloscope means coupled to the switching means for presenting a display of the time interval in which the switching means is in its second operative state in each revolution of the rotor to provide an indication of any vibration in accordance with variations in such display.

9. Apparatus for detecing the blade variation of a rotor, said apparatus including: first transducer means for producing a localized magnetic field in the path of the blades of the rotor as the rotor rotates and including means responsive to the passage of the blades through the magnetic field for developing a blade pulse for each such passage of each blade, means including second transducer means for developing a reference pulse each time the rotor passes through a predetermined angular position, signal-actuated switching means having a first stable operating condition and having a second stable operating condition, means responsive to the reference pulse and operatively coupled to the switching means to obtain an actuation of the switching means from its first operating condition to its second operating condition, means responsive to the blade pulses and operatively coupled to the switching means to obtain a return of the switching means to its first operating condition, oscilloscope means coupled to the switching means for presenting a display of the time interval in which the switching means is in its second operating condition for each revolution of the rotor, and adjustable delay means interposed between the second transducer means and the switching means for delaying the reference pulse different predetermined amounts so as to bring the same into co-operating relationship with different selected ones of the blade pulses for each revolution of the rotor.

References Cited in the file of this patent

UNITED STATES PATENTS

| | | |
|---|---|---|
| 2,193,079 | Schrader | Mar. 12, 1940 |
| 2,562,450 | De Lano | July 31, 1951 |
| 2,564,300 | Culver et al. | Aug. 14, 1951 |
| 2,575,710 | Hardigg | Nov. 20, 1951 |
| 2,634,604 | Hope | Apr. 4, 1953 |
| 2,924,977 | Kenyon et al. | Feb. 16, 1960 |
| 2,943,487 | Potter | July 5, 1960 |

FOREIGN PATENTS

| | | |
|---|---|---|
| 218,674 | Switzerland | Apr. 16, 1942 |
| 600,980 | Great Britain | Apr. 23, 1948 |
| 711,185 | Great Britain | June 23, 1954 |